(12) United States Patent
Swanson et al.

(10) Patent No.: US 7,117,297 B2
(45) Date of Patent: Oct. 3, 2006

(54) METHOD AND APPARATUS FOR STORING MULTIPLE ENTRY TYPES AND ORDERING INFORMATION USING A SINGLE ADDRESSABLE STORAGE ARRAY

(75) Inventors: Jeffrey Charles Swanson, Sunnyvale, CA (US); Debendra Das Sharma, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 467 days.

(21) Appl. No.: 10/443,747

(22) Filed: May 23, 2003

(65) Prior Publication Data

US 2004/0236900 A1    Nov. 25, 2004

(51) Int. Cl.
*G06F 13/00* (2006.01)

(52) U.S. Cl. .................... 711/104; 711/110; 711/169

(58) Field of Classification Search ............... 711/104, 711/109, 169, 110
See application file for complete search history.

(56) References Cited

U.S. PATENT DOCUMENTS

| | | | | |
|---|---|---|---|---|
| 5,675,759 A | * | 10/1997 | Shebanow et al. | 712/217 |
| 5,778,245 A | * | 7/1998 | Papworth et al. | 712/23 |
| 6,311,261 B1 | * | 10/2001 | Chamdani et al. | 712/23 |
| 6,829,699 B1 | * | 12/2004 | Leenstra et al. | 712/216 |

* cited by examiner

*Primary Examiner*—Reba I. Elmore

(57) ABSTRACT

A method and apparatus for storing and reading an entry having one of a plurality of entry types and storing order information about stored entries, using a single addressable storage array. An index pipe maintains first in, first out order of the entries stored in the addressable storage array. Stages in the index pipe store a value representing the address of the stored entry in the storage array, the type of the stored entry, and the validity of the stored entry. Additional control logic implements order rules between entry types.

20 Claims, 5 Drawing Sheets

METHOD AND APPARATUS FOR STORING MULTIPLE ENTRY TYPES AND ORDERING INFORMATION USING A SINGLE ADDRESSABLE STORAGE ARRAY

FIELD OF THE INVENTION

The present invention relates generally to a method and apparatus of storing entries representing multiple entry types using a single addressable storage array.

BACKGROUND OF THE INVENTION

Buffers are temporary storage areas, usually in random access memory (RAM). Typically, buffers operate as a holding area, enabling a central processing unit (CPU) to manipulate data before transferring the data held in the buffer to a device. A particular type of buffer is a first in, first out (FIFO) queue. A FIFO queue is a buffer in which the first entry written to the buffer is the first entry read from the buffer. The entry which has been in the FIFO queue for the longest period of time is the first entry read from the queue.

When multiple entry types are stored in a FIFO queue in RAM, a separate buffer is required for each entry type stored in order to maintain FIFO ordering within the multiple entry types. Entries can have differing priorities depending on the entry type.

One prior solution for handling multiple entry types is to use one standard FIFO queue for each entry type. For example, assume that there are two different entry types, type A and type B. The prior solution required one FIFO queue for type A and another FIFO queue for type B.

Although strict FIFO rules are followed within any one entry type, frequently multiple entry types follow different ordering rules between them. For example, ordering rules for the two example entry types A and B are as follows:
1) Within each entry type, all entries must be read from the queue in the order in which they are written to the queue;
2) One or more type A entries may be read from the queue ahead of type B entries which were written to the queue ahead of the type A entries, but type B entries may not be read from the queue ahead of type A entries which were written to the queue ahead of the type B entries.

To handle such ordering rules in addition to storing the type B entries, FIFO queue B also stores an extra "index" field with each entry corresponding to the write index, e.g. a pointer, to FIFO queue A at the time that the entry was placed in FIFO queue B. Then, in the prior solution, when attempting to remove an entry from FIFO queue B, i.e. the first entry (also referred to as the head entry) of the queue, the index field of the FIFO B entry is compared with the index field of the head entry of FIFO A. The FIFO B entry is not removed from the queue unless the index field of the head FIFO B entry is older than the index field of the head FIFO A entry.

According to the prior art, if the FIFO queue was implemented using a single unordered buffer, then (1) a read pointer pointing to the memory location, i.e. memory address, of the oldest entry in the queue and (2) a write pointer pointing to one entry behind the youngest entry in the queue must be maintained. In this case, the head and the tail of the queue (the oldest and youngest entries, respectively) can be anywhere in memory. Typically, the buffer will be considered empty when the read and write pointers point to the same address, and will be considered full when the write pointer points to one address in memory before the address pointed to by the read pointer. A "roll-over" case occurs when entries are continuously placed in the queue until the write pointer is advanced to the end of the buffer and an attempt is made to place further entries in the queue. If the read pointer is at the very start of the buffer, the buffer will be considered full, and the further entries are not placed in the queue. However, if the read pointer is not at the start of the buffer, the write pointer will "roll-over" the end of the buffer and return to the beginning. This arrangement is very complex and introduces a high potential for error.

The primary disadvantage of the prior art solution is that multiple FIFO buffer structures (such as a register array, RAM, etc.) of the same depth are required, because an entry stream could consist entirely of one entry type, or a mixture of entry types. This results in only a fraction of the storage space being used at any time while requiring the maximum allocation of memory space for each entry type. Another disadvantage is that the logic for handling the address roll-over case is complex and therefore increases the chance of errors.

SUMMARY OF THE INVENTION

It is therefore an object of the present invention to maintain entry ordering rules using a single storage structure.

It is another object of the present invention to provide a single storage structure to store multiple entry types according to ordering rules and reduce the storage space required compared to previous approaches.

Another object of the present invention is to provide a relatively low-complexity configuration which reduces the likelihood of implementation errors as compared with previous approaches.

These and other objects of the present invention are achieved by a method of storing multiple entry types and storing ordering information about stored entries, using a single addressable storage array. An incoming entry is stored in a free entry in the addressable storage array. A stage in an index pipe is loaded with information representing the address and type of the stored entry. When read requests are received from one or more requesting devices, the appropriate entry is read, removed, and returned to the one or more requesting devices from the addressable storage array, according to the ordering information stored. The index pipe is updated to reflect the removal of the requested entry from the addressable storage array.

The foregoing and other aspects of the present invention are achieved by an apparatus for storing multiple entry types and storing ordering information about stored entries, using a single addressable storage array. An index pipe includes one stage for every entry in the addressable storage array. Each stage is capable of holding information corresponding to the address and entry type of an entry in the addressable storage array. A mechanism is provided for storing entries in the addressable storage array, as well as for reading and removing entries from the addressable storage array, and for returning removed entries to one or more requesting devices.

Still other aspects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

BRIEF DESCRIPTION OF THE DRAWINGS

The present invention is illustrated by way of example, and not by limitation, in the Figures of the accompanying drawings, wherein elements having the same reference numeral designations represent like elements throughout and wherein.

DETAILED DESCRIPTION

Figure 1:
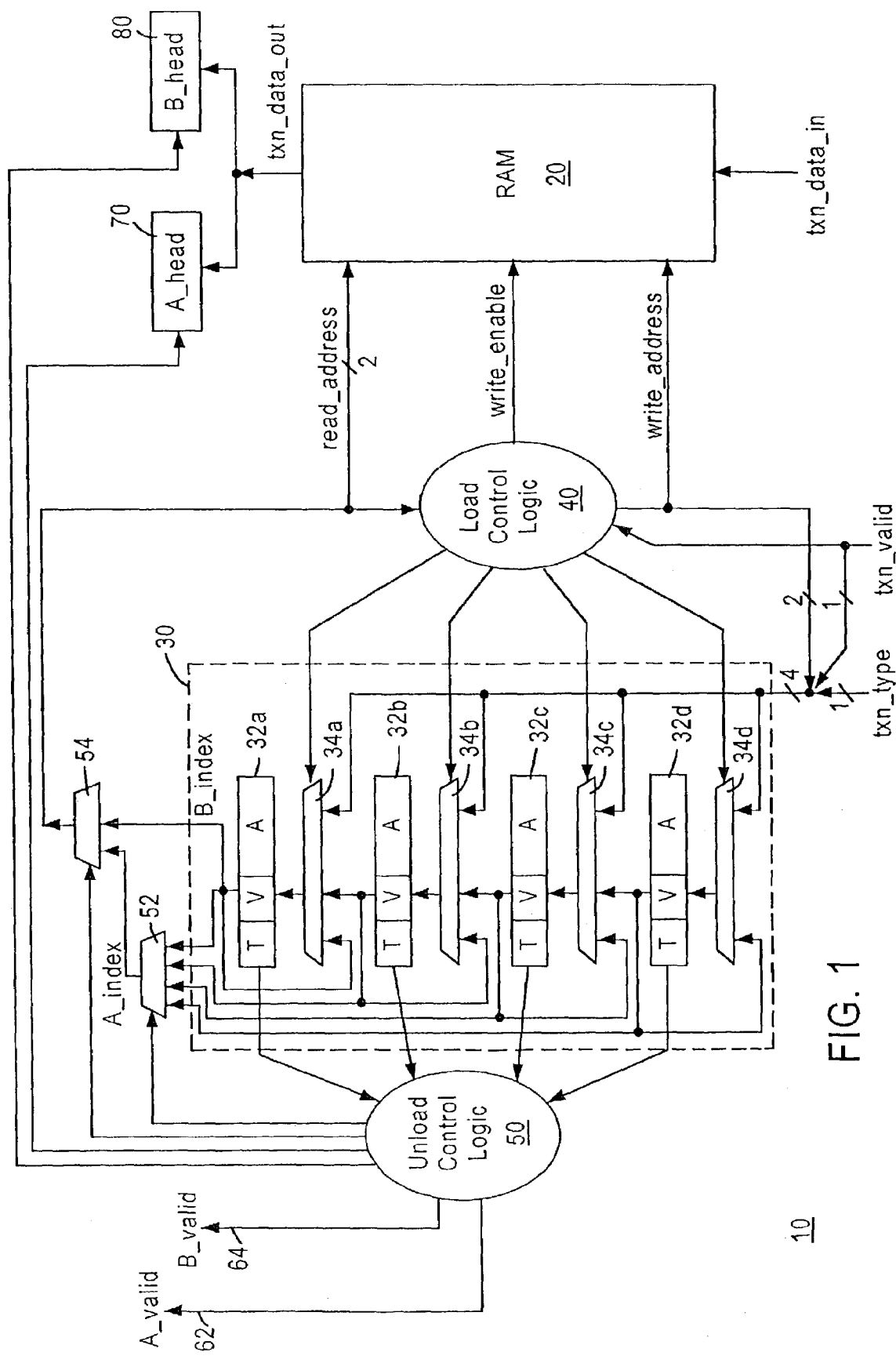
FIG. 1 is a block diagram illustrating the logical architecture of a RAM containing a single addressable storage array to be used according to the present invention and an index pipe according to the principles of the present invention.

FIG. 1 is a high-level block diagram of a buffer 10 according to an embodiment of the present invention. Access to an addressable storage array 20, i.e. a RAM, is controlled by an index pipe 30. Alternatively, the addressable storage array could be any other memory device for storing entries.

The index pipe 30 is a storage device determining where new entries are stored, i.e. written, and which stored entries to remove from the storage array 20 and send to another device (not shown) when entries are read from the buffer 10. Advantageously, the present invention uses only a single FIFO structure, i.e. storage array 20, to store multiple entry types instead of multiple FIFO structures, one FIFO for each entry type, as required by the prior art. The present invention advantageously reduces potential unused storage space, and simplifies the logic needed to handle a rollover case in the FIFO structure.

The index pipe 30 of the example embodiment includes four stage registers; one stage register 32a–32d for each location in the storage array 20 useable for storing entries. For simplicity of explanation, the storage array 20 is understood as being able to store four entries, and accordingly the index pipe 30 of FIG. 1 has four stage registers 32a–32d. Alternatively, any size storage array 20 could be used, as long as the number of entries in the storage array 20 equals the number of stage registers in the index pipe 30.

Each stage register 32a–32d includes storage for a number of bits specifying: (a) the entry type, (b) the address in which the entry referred to is stored in storage array 20, and (c) whether the stage register is valid and can be written to or read from by another device.

In the above-described example embodiment of the present invention, the number of bits specifying the type of entry is 1, as there are only two entry types, A and B. Alternatively, as will be appreciated by persons of skill in the art, the number of entry type bits varies depending on the number of entry types to be stored. For example in one non-limiting implementation, 3 bits may be used to identify 8 different entry types, 4 bits may be used to identify 16 different entry types, and so on.

In the example embodiment of the present invention, the number of bits specifying the address of the storage array 20 in which the entry is stored is 2, as there are only 4 storage locations for entries in the storage array 20. Alternatively, additional bits can be used to specify the entry in the storage array 20 if the size of the array 20 is greater than 4.

The validity bit has a value of 1 if the entry pointed to by the respective stage register is valid. A valid entry is an entry that has been written to the storage array 20 and is ready to be read or transmitted to another device. An invalid entry is an entry which has already been sent (or has never been used before) from the storage array 20 to another device such as a head register A 70 or a head register B 80. Table 1 below lists the information stored in the bits of a particular stage register 32a–32d of index pipe 30 in the above-described example:

TABLE 1

| Stage Register Bit Number | Information Stored |
| --- | --- |
| 1 | entry type, e.g. type A or B |
| 2–3 | storage array entry address |
| 4 | validity bit |

Each stage register 32a–32d is connected to a corresponding multiplexer 34a–34d for receiving input. Input selection on each multiplexer 34a–34d is controlled by a load control logic 40. The choice of input to each multiplexer on each clock cycle is between (1) the current value of the stage register 32a–32d, i.e. a "hold" of the value in the stage register, (2) the value of input coming from the load control logic 40, i.e. a new value written to buffer 10, and (3) the value of the next upstream stage register 32b–32d with respect to the stage register 32a–32c. The most upstream stage register 32d is cleared rather than receiving input from another stage register.

References to each entry in the storage array 20 are moved from upstream stage register 32b–32d to downstream stage register 32a–32c to replace references to entries which have been removed from the queue and transmitted to a target destination. Stage register values continually flow toward stage register 32a as new input is received. In this manner, the index pipe 30 maintains FIFO ordering of the entries in the storage array 20 without ever creating a roll-over case, regardless of which entries in the storage array 20 are currently being used.

When an entry (txn_data_in) is received, the load control logic 40 enables the storage array 20 to receive and store the value of txn_data_in to an address (write_address) in storage array 20 specified by logic 40. The load control logic 40 assigns the next free stage register 32a–32d to store a reference to txn_data_in. The validity bit of the stage registers 32a–32d is read by the load control logic 40 to determine which stage register 32a–32d is the next free stage register. The load control logic 40 writes the entry type of txn_data_in (txn_type) to the determined free stage register. The load control logic 40 also writes the address in storage array 20 (write_address) to which the value of txn_data_in was written to the determined next free stage register. The validity bit of the determined next free stage register is set to indicate the register contents are valid, i.e.

an entry of a specific entry type (txn_type) has been written to storage array 20 at a specific address (write_address).

An unload control logic 50 keeps track of which entry type is held in each storage array 20 address by reading the entry type bits of each stage register 32a–32d indicating the entry type held in each storage array 20 address pointed to by each valid stage register 32a–32d. According to the example ordering rules described above, of particular note is whether the first stage register (stage register 32a) refers to a type B entry, and which of the stage registers 32a–32d is the first to refer to a type A entry.

An A_index multiplexer 52 selects among the values stored in each of the stage registers 32a–32d to select a value to be written to AB_index multiplexer 54. A AB_index multiplexer 54 selects between the output of the A_index multiplexer 52 and the value stored in the stage register 32a. Whenever there is a change in the value stored in one of the stage registers 32a–32d affecting which entries of the storage array 20 are eligible for removal from the queue (i.e. according to the ordering rules in the preferred embodiment, the location pointed to by the first type A entry and the location pointed to by the stage register 32a if the stage register 32a points to a type B entry), the unload control logic 50 transmits a signal (read_enable not shown) to the storage array 20, and the entry eligible for removal from the storage array 20 is read into the appropriate head register, i.e. A_head register 70 or B_head register 80. In this manner, the A_head and B_head registers 70, 80 are preloaded with the next A type entry and B type entry in storage array 20. For example, the A_head register 70 is loaded (if the new entry eligible for removal from the queue is a type A entry) or into the B_head register 80 (if the new entry eligible for removal from the queue is a type B entry). The unload control logic 50 selects the location of the new entry eligible for removal from the queue using the A_index multiplexer 52 and the AB_index multiplexer 54 to select from all of the addresses in the stage register 32a–32d.

Alternatively, the A_head register 70 and the B_head register 80 could be removed without substantive change to the present invention. In this case, the time required to return entries from storage array 20 to a requesting device will be dependent on the time required to retrieve data from the storage array 20, and entries will not be read from the storage array 20 until a request is received from a requesting device.

The unload control logic 50 transmits a signal along the A_valid wire 62 to a device (not shown) receiving entries from the buffer 10 whenever there is a type A entry ready to be removed from the buffer 10. The unload control logic 50 transmits a signal along the B_valid wire 64 to a device (not shown) whenever there is a type B entry ready to be removed from the buffer 10. One or more devices (not shown) which read from the buffer 10 implemented in accordance with the above-described embodiment of the present invention receive the signals on the A_valid wire 62 and the B_valid wire 64 to determine the entry type readable at any given time.

Received read requests specify the entry type requested. In the preferred embodiment, a read request is only received when a matching entry type is available for removal from the buffer 10, as indicated by the respective signals on the A_valid wire 62 and the B_valid wire 64. Alternatively, a request for an unavailable entry type is held until an entry of that type is available for removal from the buffer 10.

Assuming that the entry type requested is available in storage array 20, the entry in the A_head register 70 or the B_head register 80 is transmitted to the requesting device, according to the entry type requested. The load control logic 40 is notified that the address in storage array 20 is now free, according to methods known to those skilled in the art. The load control logic 40, for each stage register 32b–32d upstream from the stage register which held the location of the entry read by the requesting device, advances the stage register value to the register one position downstream, i.e., if data is read from the address in the stage register 32b, the stage register 32b receives the stage register 32c value, the stage register 32c receives the stage register 32d value, and so on (if there are more stage registers). The last stage register value (32d in FIG. 1) is cleared. The value selected by the A_index multiplexer 52 and the AB_index multiplexer 54 is updated as described above to identify the address of the first A type and B type entry, respectively. If a new entry is eligible for removal from the storage array 20, the new entry eligible for removal is read from the array 20 into the A_head register 70 or the B_head register 80, as appropriate depending on the entry type.

Figure 2:
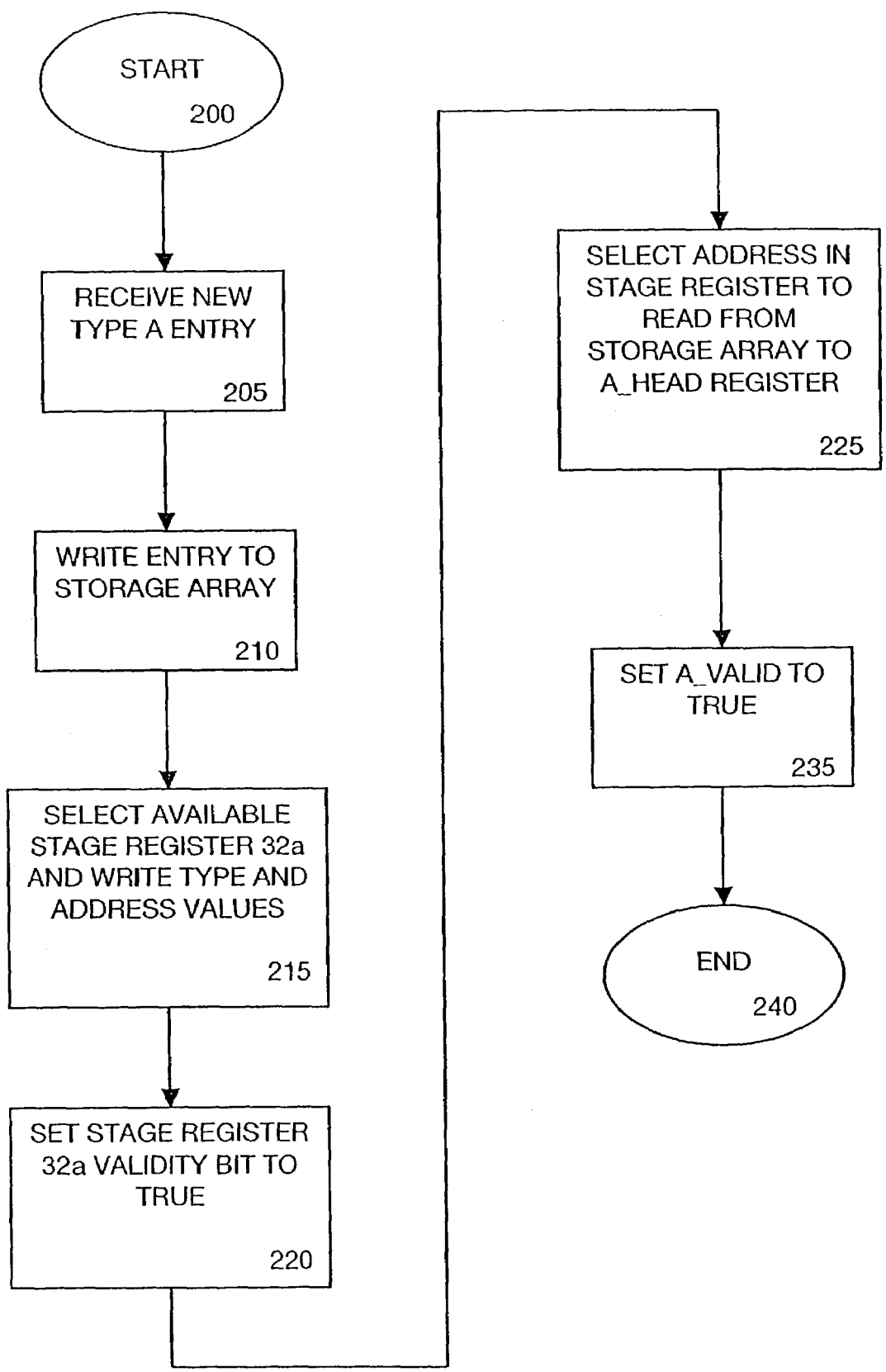
FIG. 2 is a flow diagram illustrating the steps executed in the example case of a type A entry being placed into an empty FIFO queue according to the preferred embodiment of the present invention.

Referring now to FIG. 2, a flow diagram depicts the flow of control of steps executed in the example of placing a type A entry into an empty FIFO queue in storage array 20 according to a preferred embodiment of the present invention. An empty FIFO queue in storage array 20 according to the present invention is one in which all stage register 32a–32d validity bits are set to false. In this state, the A_valid wire 62 and the B_valid wire 64 are both set to false.

The process starts at step 200. At step 205, a type A entry, referred to as txn_data_in, is received by buffer 10 from a device (not shown). At step 210, the load control logic 40 enables the writing of the value of txn_data_in to a free address in the storage array 20. The stage register 32a is the first (most-downstream) free stage register. At step 215, the load control logic 40 selects the stage register 32a of index pipe 30 as an empty index location according to the preferred embodiment of the present invention. After the load control logic 40 selects the stage register 32a, the type of txn_data_in and the address of storage array 20 to which the value of txn_data_in was written in step 210 are written to the type and address bits of the stage register 32a, respectively. At step 220, the load control logic 40 sets the validity bit of the stage register 32a to true. At step 225, the unload control logic 50 selects the address in the stage register 32a to be read from the storage array 20, and the data in the corresponding address of the storage array 20 is copied to the A_head register 70. At step 235, the unload control logic 50 sets the A_valid wire 62 to true. At step 240, the process is completed.

Figure 3:
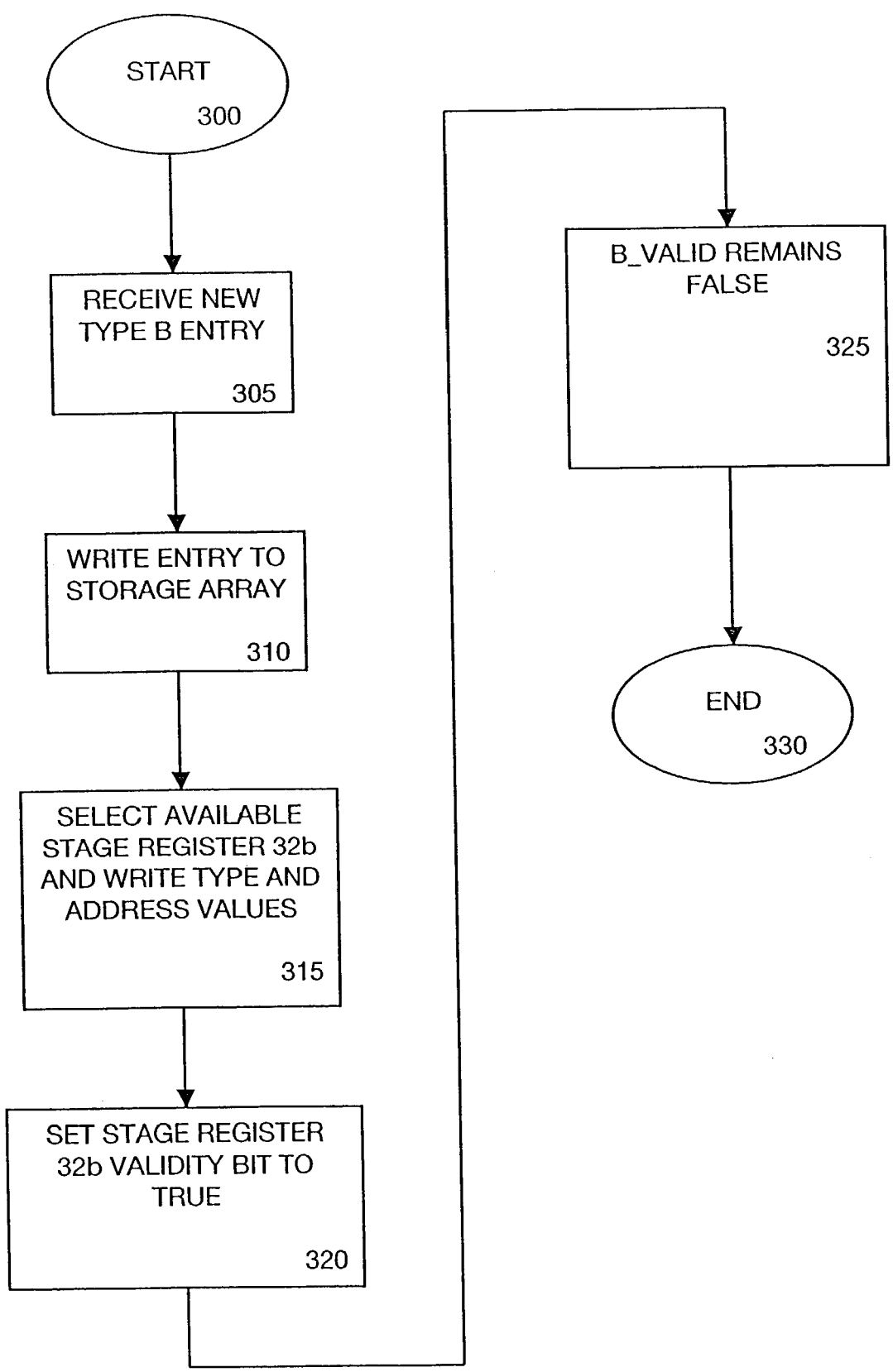
FIG. 3 is a flow diagram illustrating the steps executed in the example case of a type B entry being placed into the FIFO queue in the state after execution of the example of FIG. 2.

Referring now to FIG. 3, a flow diagram depicts the flow of control of the steps executed in the example case of placing a type B entry into the FIFO queue in storage array 20 after execution of the example of FIG. 2. In this state, the stage register 32a validity bit is set to true, type bits are set to type A, and address bits point to a type A entry in the storage array 20. All other stage register 32b–32d validity bits are set to false. The A_valid wire 62 is set to true, and the B_valid wire 64 is set to false.

The process starts at step 300. At step 305, a type B entry, referred to as txn_data_in, is received by buffer 10 from a device (not shown). At step 310, the load control logic 40 enables the writing of the value of txn_data_in to an available address in the storage array 20. At step 315, the load control logic 40 selects the stage register 32b, which after execution of the process of FIG. 2 is the first (downstream-most) available stage register. After the txn_data_in is written to the address in storage array 20, the entry type of txn_data_in and the address in storage array 20 to which the value of txn_data_in was written in step 310 are written to the type and address bits of the stage register 32b, respectively. At step 320, the load control logic 40 sets the validity bit of the stage register 32b to true. At step 325, the unload control logic 50 determines that the type bits in stage register 32b indicate that the entry is a B type entry and applying the above-described ordering rules, logic 50 determines that the entry is not able to be removed from the queue ahead of the A type entry identified by stage register 32a. txn_data_in is pointed to by the stage register 32b, and is not available to be removed from the queue and sets the B_valid wire 64 false. At step 330, the process is completed.

Figure 4:
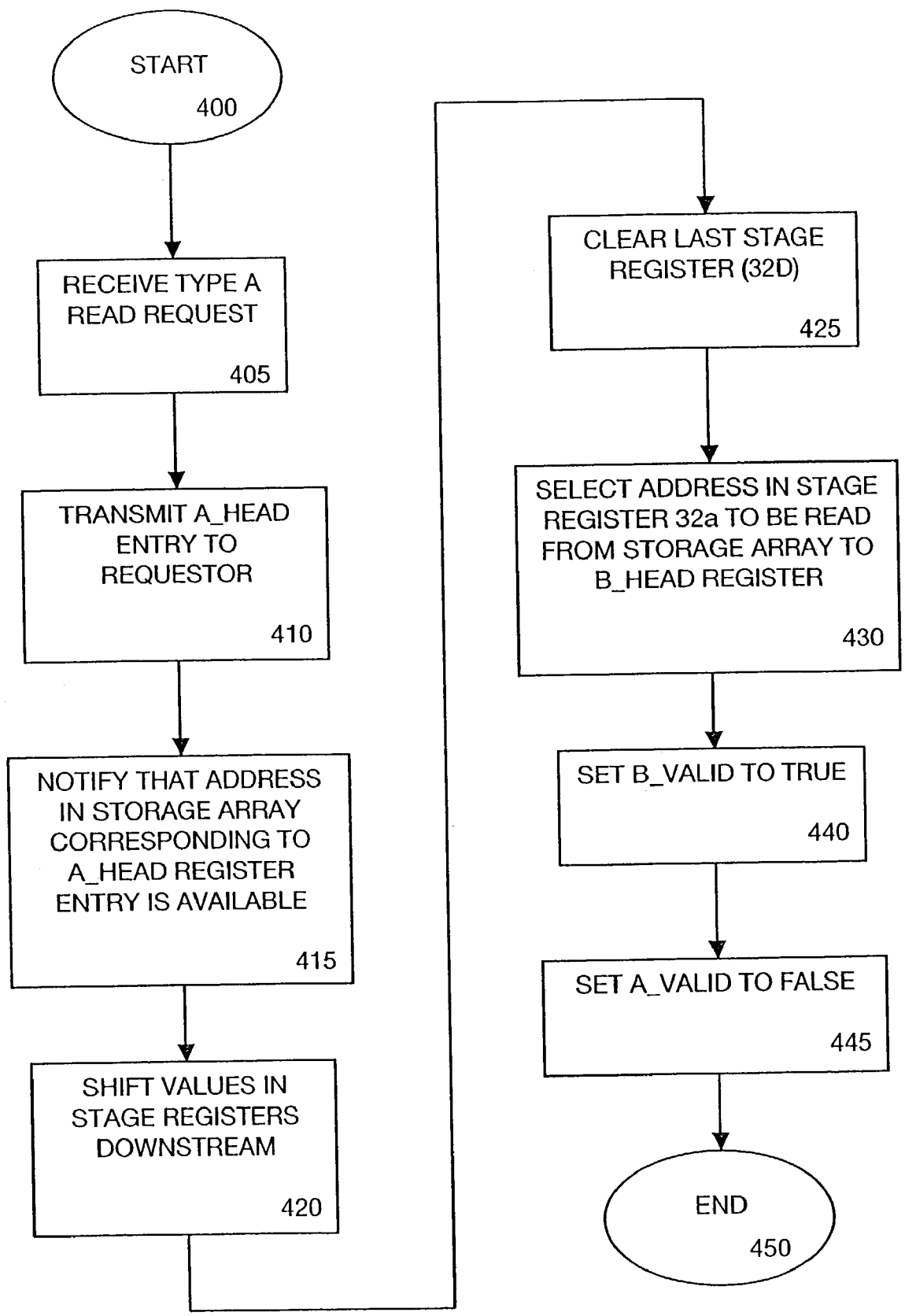
FIG. 4 is a flow diagram illustrating the steps executed in the example case of removing from the queue an entry of type A from the FIFO queue in the state after execution of the example of FIG. 3.

Referring now to FIG. 4, a flow diagram depicts the flow of control of the steps executed in an example of removing a type A entry from the buffer 10 after execution of the example of FIG. 3. In this state, the stage register 32a validity bit is set to true, type bits are set to type A, and address bits include the address of a type A entry in the storage array 20. The stage register 32b validity bit is set to true, type bits are set to type B, and address bits include the address of a type B entry in storage array 20. All other stage register 32c–32d validity bits are set to false. The A_valid wire 62 is set to true, and the B_valid wire 64 is set to false.

The process starts at step 400. At step 405, a read request is received by buffer 10 from a device (not shown) for a type A entry. At step 410, the entry, referred to as txn_data_out, in the A_head register 70 is sent to the requesting device. At step 415, the load control logic 40 determines that the entry in the storage array 20 from which txn_data_out was copied is available. At step 420, the load control logic 40 sets the multiplexers 34a–34d such that the value in the stage register 32b is copied into the stage register 32a, the value in the stage register 32c is copied into the stage register 32b, the value in the stage register 32d is copied into the stage register 32c. At step 425, the stage register 32d is cleared. Advantageously, steps 420 and 425 advance the contents of the FIFO queue without having to accommodate roll-over cases. At step 430, the unload control logic 50 selects the address in the stage register 32a to be read from the storage array 20, and the data in the corresponding address of the storage array 20 is copied to the B_head register 80. At step 440, the unload control logic 50 sets the B_valid wire 64 to true. At step 445, the unload control logic 50 sets the A_valid wire 62 to false. At step 450, the process is completed.

Figure 5:
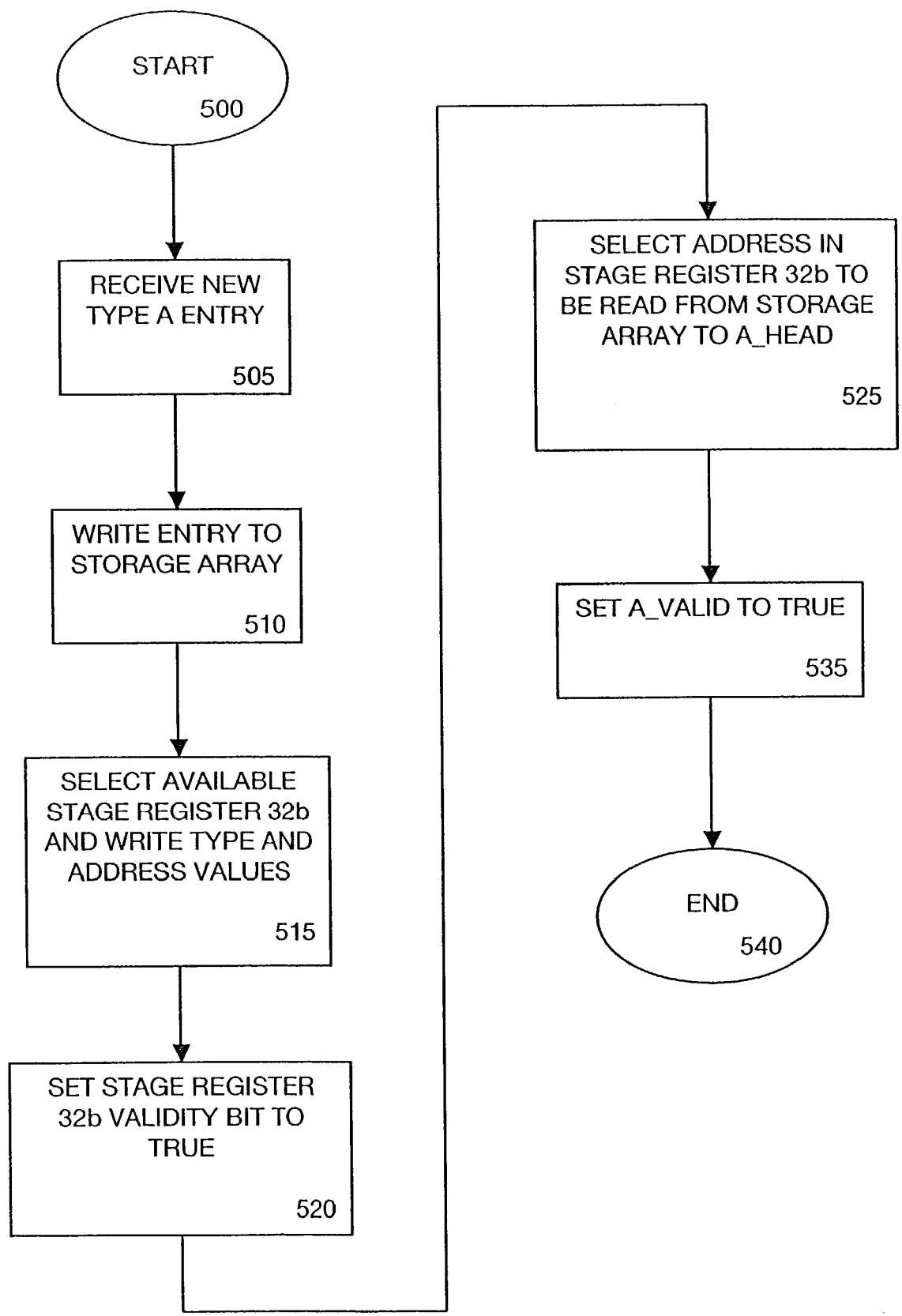
FIG. 5 is a flow diagram illustrating the steps executed in the example case of a type A entry being placed into the FIFO queue in the state after execution of the example of FIG. 4.

Referring now to FIG. 5, a flow diagram depicts the flow of control of steps executed in an example of placing a type A entry into the buffer 10 after execution of the example of FIG. 4. In this state, stage register 32a validity bit is set to true, type bits are set to type B, and address bits include the address of a type B entry in the storage array 20. All other stage register 32b–32d validity bits are set to false. The A_valid wire 62 is set to false, and the B_valid wire 64 is set to true.

The process starts at step 500. At step 505, a new type-A entry, referred to as txn_data_in, is received by buffer 10 from a device (not shown). At step 510, the load control logic 40 writes the value of txn_data_in to an available address in the storage array 20. At step 515, the load control logic 40 selects the stage register 32b, which after execution of the process of FIG. 4, is the first available (downstream-most) stage register. After the load control logic 40 enables the writing of txn_data_in to the storage array 20, the type of txn_data_in and the address in the storage array 20 to which the value of txn_data_in was written in stage 510 are written to the type and address bits of the stage register 32b, respectively. At step 520, the load control logic 40 sets the validity bit of the stage register 32b to true. At step 525, the unload control logic 50 selects the address in the stage register 32b identifying the address of the entry to be read from the storage array 20, and the entry in the identified address of the storage array 20 is transferred to the A_head register 70 (according to the above-described ordering rules specifying that an A type entry may be removed before a B type entry). At step 535, the unload control logic 50 sets the A_valid wire 62 to true. At step 540, the process is completed.

Alternatively, an embodiment of the present invention can be easily extended to allow for one cycle timing for an entry to be transferred to the head register by bypassing the addressable storage array structure in cases where the received entry is immediately eligible for removal from the queue according to the entry ordering rules. According to the example entry ordering rules of the above-described embodiment, these cases include when the FIFO queue is empty and a type B entry is received, or when the FIFO queue contains no type A entries and a type A entry is received.

An embodiment of the present invention can be extended to handle any number of entry types with the ordering rules expanded in a hierarchical manner. For example, if the number of entry types is n, then the number of bits in each stage register 32a–32d specifying the entry type must be $\log_2 n$. Similarly, there must be n head registers and n index multiplexers (one for each entry type). The load control logic 40 and the unload control logic 50 would require changes according to methods known to those skilled in the art.

It will be readily seen by one of ordinary skill in the art that the present invention fulfills all of the aspects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of storing and reading entries of multiple types and storing ordering information about stored entries, using a single addressable storage array, comprising:
    storing an entry into an available address of the addressable storage array;
    storing a value representing the address and a value representing the type of the stored entry;
    reading an entry from the addressable storage array in accordance with order rules based on the entry type;
    transferring the read entry to a requesting device; and
    updating the stored values to reflect the removal of the entry from the addressable storage array.

2. The method of claim 1, wherein the order rules are first in, first out order rules.

3. The method of claim 2, wherein the order rules specify that the oldest entry of a specific entry type is read from the addressable storage array ahead of another entry type, regardless of the first in, first out order.

4. The method of claim 1, wherein a signal is transmitted to one or more requesting devices whenever an entry of a specific type is available to be read.

5. The method of claim 1, wherein the addressable storage array is a random access memory.

6. The method of claim 1, wherein the values are stored in a register including bits corresponding to an address in the addressable storage array, an entry type, and the validity of the corresponding entry.

7. An apparatus for storing and reading multiple entry types and storing order information about stored entries, using a single addressable storage array, comprising:
   an addressable storage array;
   an index pipe including one stage for each entry of the addressable storage array, wherein each stage of the index pipe is able to store information corresponding to the address and type of an entry in the addressable storage array;
   control logic for reading entries from the addressable storage array;
   control logic for returning removed entries to a requesting device.

8. The apparatus of claim 7, further comprising control logic for maintaining order rules by entry type specifying which entry can be read from the addressable storage array at a specific time.

9. The apparatus of claim 8, wherein the control logic for maintaining order rules comprises first in, first out control logic for maintaining first in, first out order by entry type.

10. The apparatus of claim 9, wherein the control logic for maintaining order rules further comprises rule logic for allowing the oldest entry of certain entry types to be read from the addressable storage array ahead of entries of another type, regardless of their respective first in, first out order.

11. The apparatus of claim 7, further comprising a type availability logic for transmitting a signal to a requesting device whenever a particular entry type is available to be read.

12. The apparatus of claim 7, wherein the addressable storage array is a random access memory.

13. The apparatus of claim 7, wherein each stage in the index pipe is a register including bits corresponding to an address in the addressable storage array, bits corresponding to an entry type, and a bit indicating validity of the entry.

14. A method of providing an entry from a buffer to a requester by applying order rules for plural entries having different entry types using entry ordering information and ordering rules, wherein the plural entries are stored in a single addressable storage array, wherein a type available value is set indicating the availability of an entry of a first entry type, the method comprising the steps:
   receiving a request for an entry of the first entry type;
   transferring the requested entry to the requester;
   removing the entry from the single addressable storage array;
   set the type available value to indicate the unavailability of an entry of the first entry type;
   determining an entry in the single addressable storage array to be the next available entry of a particular entry type using the entry ordering information; and
   if an entry of the particular entry type is available, set the type available value to indicate the availability of an entry of the particular entry type.

15. The method of claim 14, wherein the entry ordering information includes a location value representing the location of the entry stored in the single addressable storage array and a type value representing the type of the entry.

16. The method of claim 15, wherein the entry ordering information is stored in a connected series of registers and wherein said determining step further comprises:
   shifting entry ordering information in the registers to overwrite the entry ordering information in the register corresponding to the removed entry.

17. The method of claim 15, wherein the entry ordering information is stored in a connected series of registers and wherein said determining step further comprises:
   removing the entry ordering information from the register corresponding to the removed entry; and
   shifting entry ordering information in the registers to fill the register corresponding to the removed entry.

18. The method of claim 14, wherein a copy of the available entry is stored in a register and wherein the transferring step further comprises:
   transferring the available entry from the register to the requestor.

19. The method of claim 18, further comprising:
   if an entry of the particular entry type is available, transfer a copy of the particular entry to the register.

20. The method of claim 19, wherein the entry ordering information includes a location value representing the location of the entry stored in the single addressable storage array and a type value representing the type of the entry.

* * * * *

UNITED STATES PATENT AND TRADEMARK OFFICE
CERTIFICATE OF CORRECTION

PATENT NO.         : 7,117,297 B2                                                Page 1 of 1
APPLICATION NO. : 10/443747
DATED              : October 3, 2006
INVENTOR(S)        : Jeffrey Charles Swanson et al.

It is certified that error appears in the above-identified patent and that said Letters Patent is hereby corrected as shown below:

In column 9, line 42, in Claim 14, delete "requester" and insert -- requestor --, therefor.

In column 10, line 4, in Claim 14, delete "requester" and insert -- requestor --, therefor.

Signed and Sealed this

Eighth Day of December, 2009

David J. Kappos
*Director of the United States Patent and Trademark Office*